United States Patent [19]

Temple et al.

[11] 4,394,475
[45] Jul. 19, 1983

[54] AQUEOUS SIZING COMPOSITION FOR PRODUCING SIZED GLASS FIBER STRANDS WITH IMPROVED SLIP FLOW PROPERTIES

[75] Inventors: Chester S. Temple, McKees Rocks; Ed C. Hsu, Pittsburgh, both of Pa.

[73] Assignee: PPG Industries, Inc., Pittsburgh, Pa.

[21] Appl. No.: 334,202

[22] Filed: Dec. 24, 1981

[51] Int. Cl.³ .............................................. C08K 5/54
[52] U.S. Cl. .................................. 524/262; 524/276; 524/487; 524/488; 524/489; 524/586; 524/836; 428/378; 428/391
[58] Field of Search ............... 524/262, 276, 487, 488, 524/489, 586, 836; 428/378, 391

[56] References Cited

U.S. PATENT DOCUMENTS

| | | | |
|---|---|---|---|
| 3,655,353 | 4/1972 | Nalley et al. | 65/3 |
| 3,814,715 | 6/1974 | Nalley et al. | 260/29.6 A X |
| 3,882,068 | 5/1975 | Swartz | 260/29.6 |
| 3,936,415 | 2/1976 | Coakley | 260/42.15 |
| 3,946,132 | 3/1976 | Hedden | 428/378 |
| 4,143,006 | 3/1979 | Workman | 260/17.4 ST |
| 4,240,944 | 12/1980 | Temple | 260/29.6 NR |

FOREIGN PATENT DOCUMENTS 50-48233  6/1975  Japan .

*Primary Examiner*—Melvyn I. Marquis
*Attorney, Agent, or Firm*—Kenneth J. Stachel

[57] ABSTRACT

Sized glass fiber strands are provided that have improved slip/flow characteristics. This improved characteristic is achieved by sizing glass fibers with an aqueous sizing composition having one or more nonstarch film forming polymers, one or more coupling agents, one or more lubricants or a mixture thereof, polyethylene-containing polymer with limited branching and water. The aqueous sizing composition can also have a wax having a melting point greater than 50° C. where the total amount of the polyethylene polymer and wax is not greater than about 15 weight percent of the aqueous sizing composition.

15 Claims, No Drawings

AQUEOUS SIZING COMPOSITION FOR PRODUCING SIZED GLASS FIBER STRANDS WITH IMPROVED SLIP FLOW PROPERTIES

The present invention is directed to an aqueous sizing composition and sized glass fiber strands produced therewith that yield sized glass fiber strands having improved slip/flow properties resulting in improved processing of the strands, when a mass of strands is being processed for the reinforcement of polymeric materials.

Glass fibers are formed by being drawn at a high rate of speed from molten cones of glass from tips of small orifices in a platinum device known as a bushing. Soon after the fibers are formed from the bushing, a treating composition known as a sizing composition, which is usually an aqueous composition is applied to the fibers. The aqueous sizing composition protects the glass fibers from interfilament abrasion during the formation of glass fibers and during gathering of the glass fibers into glass fiber strands and during further processing. Another function of the sizing composition is to make the glass fibers compatible with polymeric materials in which they may be used as reinforcement. When the glass fibers are formed by the attenuation from the molten streams of glass, the process is usually referred to as a forming process and can result in the production of chopped glass fiber strands or continuous glass fiber strands. In the former, the glass fibers are gathered and processed through a chopping device, and collected as wet chopped glass fiber strands. In the latter, the glass fibers are gathered into one or more bundles of fibers typically called strands and wound layer on top of layer into a forming package. The forming package is usually dried and the dried continuous sized glass fiber strands can be dry chopped, combined with other strands to form a roving, produced into a mat, or woven into a fabric. Glass fibers in all of these forms can be used to reinforce polymeric materials such as thermoplastic and thermosetting polymers.

In using the glass fibers in their various forms for reinforcing polymeric materials, the glass fibers experience various processing conditions in producing the final reinforced polymeric material. For instance, in producing bulk molding thermosetting compound, the chopped glass fiber strands are subjected to a high shear mixer to disperse the glass fibers throughout a polymeric mixture having an unsaturated thermosetting polymer, catalyst, thickeners and additional monomers and other ingredients. Also the glass fiber strands may travel over numerous contact points and be pulled, turned and thrown into a mat formation, which may subsequently be needled with sharp, barbarous needles. Also, the glass fiber strands may be pulled and shot through weaving looms to form woven fabric. Woven fabric or mat may be combined with chopped glass fiber strands or chopped glass fiber strands could be used alone in forming a molding compound such as a sheet compound. In the formation of such a sheet molding compound or in the formation of a bulk molding compound, the chopped glass fiber strands are delivered to the processing apparatus in some type of bulk package which is dumped into a delivery or handling system. The chopped glass fiber strands must flow through this system in order to be processed into the desired product.

As aforementioned, one of the roles of the sizing composition is to protect the glass fibers during the forming process and during the rigors of subsequent processing. The sizing composition performs this role by being present as a coating on the surface of the glass fibers making up the glass fiber strand. To accomplish this role, the sizing composition usually has one or more polymeric film formers, lubricants, coupling agents, other additives and a carrier which is usually water. The film forming polymers provide the film-like coating on the surface of the glass fibers, while the coupling agent provides for linking the surface of the glass fiber with the film forming polymer and the polymeric material, which is reinforced with the glass fibers. The lubricant provides lubricity for the sized glass fibers and it has been reported that cationic lubricants aid in the processing of glass fiber strand and the roving formed therefrom by imparting slip to the exterior of the strand or roving as it passes over various types of processing equipment. Such a cationic lubricant is typically an amine salt of a fatty acid, where the fatty acid moiety of the salt may have between about 12 and 22 carbon atoms and the amine is usually a tertiary amine of low molecular weight. For example, the alkyl groups attached to the nitrogen atom may have between 1 and 6 carbon atoms. Other additives that may be used include emulsifying agents, wetting agents, bactericides, plasticizers and the like.

It is an object of the present invention to provide an aqueous sizing composition and sized glass fiber strands produced therewith that allow for improved processabiity of sized glass fiber strands in producing reinforced polymeric materials. The improved processability stems from better handling of the sized glass fiber strand over contact points, in bulk handling and feeding devices, and with other tortuous manipulations experienced by glass fiber strands in processing and producing reinforced polymeric materials.

SUMMARY OF THE INVENTION

The foregoing object and other advantages enumerated herein and gleaned eclectically from the following disclosure are accomplished by the aqueous sizing composition and sized glass fiber strands of the present invention.

We have unexpectedly found that sized glass fiber strands for use in reinforcing polymeric materials having a dried residue of an aqueous sizing composition having a non-starch film forming polymeric material, which is compatible with the polymeric materials to be reinforced with the sized glass fiber strands, and one or more coupling agents, and one or more lubricants can be provided with increased slip/flow properties by incorporating into the aqueous sizing composition a synergistic mixture of a polyethylene polymer and a wax with a melting point greater than 50° C. The polyethylene polymer and the wax are dispersible, solubilizable or emulsifiable in aqueous solutions. The mixture of the polyethylene polymer and wax synergistically increase the slip/flow properties of the sized glass fiber strands. Although, the amount of these materials must be controlled, since the usage of too high an amount of the polyethylene polymeric material and the wax material can lead to deterioration of other physical properties of the sized glass fiber strands. For this reason, the amount of the polyethylene polymer in an aqueous sizing composition should not be greater than about 25 weight percent of the solids of the aqueous sizing composition. Also the amount of the wax in the aqueous sizing composition should not be greater than about 10 weight percent of the solids of the aqueous sizing composition. If the polyethylene-containing polymer that is used in the composition has a density of greater than around 0.935, the amount of wax present in the composition can be reduced or even deleted.

An aqueous sizing composition employing the synergistic mixture of polyethylene polymer and wax can be prepared by conventional methods and applied to glass fibers by any of the conventional processes known to those skilled in the art. When the sized glass fiber strands are dried, the drying should be performed at any temperature and time that are sufficient to remove a substantial amount of moisture from the strands. The dried sized glass fiber strands may be those that were prepared by the wet chop forming process and dried, or those that were prepared by a continuous strand forming process and dried and subsequently chopped or subsequently roved or prepared into mat or fabric. These forms of the sized glass fiber strand are now ready for processing of reinforced polymeric materials, wherein improved handling of the sized glass fiber strands can be realized.

DETAILED DESCRIPTION OF THE INVENTION

Sized glass fiber strand in various forms are used to reinforce both thermoplastic and thermosetting polymeric materials. The sized glass fiber strands usually have the dried residue of an aqueous sizing composition, this is of the aqueous reinforcement type of sizing composition. In various processing to produce glass fiber reinforced thermoplastic and thermosetting polymeric materials, a desirable characteristic of the sized glass fiber strand is the slip/flow of the sized glass fiber strands. This characteristic is most desired in chopped glass fiber strands so that the chopped strands of various lengths ranging from ⅛ inch of less to 3 inches or more can slip by one another and adequately flow through the processing machinery used in producing reinforced thermoplastic and thermosetting polymeric materials. Also, the slip/flow characteristic aids the sized glass fiber strands throughout the thermoplastic or thermosetting polymers during processing to produce the reinforced thermoplastic and thermosetting polymeric materials. The slip/flow characteristic of sized glass fiber strands is also useful in continuous sized glass fiber strands by aiding in the conveyance of the continuous strands over contact points and under forces placed on the strand by processing machinery. The slip/flow characteristic of sized glass fiber strand is measured by various analytical tests which include the funnel flow test and the bulk density test.

The funnel flow test is conducted as follows by placing a given quantity of the chopped glass fiber strands either dry chopped or dried wet chop in a funnel equipped for vibration. The time it takes the total weight to pass through the funnel is recorded.

The bulk density test is conducted to determine apparent bulk density. First a measured weight of chopped strands are poured into a 250 milliliter graduated cylinder. The cylinder is mounted into a bulk density tester like that available as J-M Bulk Density Tester from Richmond's Machine Company, East Main Street, Montpelier, Ohio 43543. The counter of the tester is set for 50 taps and the machine is started. After the machine stops, the volume of glass fibers in the graduated cylinder is read. The apparent bulk density is then calculated by dividing the weight of chopped strand by the volume reading after tapping. This figure is multiplied by 62.43 to obtain the apparent bulk density in pounds per cubic foot.

The synergistic mixture of the polyethylene polymer and the wax in the aqueous sizing composition of the present invention must be used with a sizing composition containing a film forming polymeric material, which provides integrity to the glass fiber strand, and compatability of the sized glass fiber strand with the thermoplastic or thermosetting polymer which is reinforced by the sized glass fiber strand. The film forming polymers that provide these characteristics to the sized glass fiber strand are the non-starch film forming polymers. These polymers are film forming in the sense that through a chemical reaction such as crosslinking or oxidation or a physical event like solvent removal, like drying to remove water, these polymers form a dry continuous film. Nonexclusive examples of these non-starch film forming polymers for the reinforcement type aqueous sizing composition of the present invention include polyvinyl acetate homopolymers and copolymers and terpolymers, 1,2-epoxy polymers; 1,3-epoxy polymers; polyurethanes; epoxy polyurethane copolymers; polyacrylates including polymethacrylates; poly-(ethylene) vinylacetate; butadiene; butadiene-styrene copolymers; polystyrene; acrylonitrile-butadiene-styrene; polyesters, both saturated and unsaturated; vinyl esters; polyamides; melamine-aldehyde condensates; phenolic aldehyde condensates; urea aldehyde condensates and the like. All of these polymeric materials are commercially available and are produced from known reactants.

One or more specific film formers will be used in the aqueous sizing composition. The selection of the particular film former will depend upon the type of polymer to be reinforced so that the polymeric film former is compatible with the matrix polymer, and the degree of integrity that is desired in the sized glass fiber strand. The selection of the polymeric film former on the basis of compatibility will be to match the polymeric film former with the matrix polymer, which can be a thermoplastic or thermosetting resin. Nonexclusive examples of the thermoplastic resins that can be reinforced include polypropylene, polyamide, thermoplastic and vinyl esters, polystyrene, polyphenylene oxide and polyphenyloxide, polycarbonate, thermoplastic polyesters such as polyethylene terephthalate, polybutylene terephthalate, and the like. Nonexclusive examples of thermosetting polymers include unsaturated polyester polymers that are reaction products of saturated or unsaturated polyols and saturated or unsaturated polycarboxylic acids and/or anhydrides, epoxy polymers that contain one or more oxirane structures and are produced by the reaction of epihalohydrin with bisphenol-A, phenolic polymers formed by the reaction of polyhydroxy benzenes and aldehydes, urea and melamine polymers formed by the reaction with aldehydes, polyurethanes formed by the reaction of polyols and polyisocyanates, homopolymers of diallyl phthalate, and the like. The amount of the non-starch polymeric film former in the aqueous sizing composition is any amount that is conventionally used in aqueous sizing composition. Typically, this amount ranges from about 1 to about 20 weight percent of the aqueous sizing composition.

Coupling agents that are used in the aqueous sizing of the present invention are generally chemicals which render the surfaces of the glass fiber material compatible with the resin with which they are to be employed in preparing glass fiber reinforced polymeric resins or elastomers. These materials can be organo silane and siloxane materials or basic (hydroxy-containing) metal salts of strong mineral acids. Examples of organo silane coupling agents that can be used are vinyl and allyl halo, alkoxy, amino organo, acryloxy or methacrylate silanes, their hydrolysis products and polymers of the hydrolysis products and mixtures of any of these materials are suitable for such use. Some of these silanes are disclosed in U.S. Pat. Nos. 2,688,006; 2,688,007; 2,723,211; 2,742,378; 2,754,237; 2,776,910, and 2,799,598. The salts of the strong mineral acids can be such materials as a basic chromium chloride, basic chromium sulfate, etc. These compounds are ones with a trivalent metal ion selected from chromium, cobalt, nickel, copper and lead, and at least one hydroxyl group attached to the metal, and at least anion of a strong mineral acid attached to the metal (as well as coordinate complexes of these compounds and mixtures thereof). Also, another type of coupling agent that can be used is a complex compound of a Werner-type in which a trivalent nuclear atom such as chromium, is coordinated with an organic acid such as methacrylic acid, i.e., a methacrylic acid complex of chromic chloride. Mixtures of two or more of any of these coupling agents may also be used. The amount of the coupling agent used in the aqueous sizing composition of the present invention is that conventionally used in aqueous sizing compositions for glass fibers. This amount typically ranges from about 0.1 to about 4 weight percent of the aqueous sizing composition.

Nonexclusive examples of particular silanes that have been found useful in aqueous sizing composition of the present invention include silane coupling agents, where at least one silane coupling agent is an amino silane coupling agent. This amino silane coupling agent can be selected from the group of monoamino and diamino silanes such as gamma-aminopropyltriethoxysilane, N-(trimethoxysilypropyl)ethane diamine acrylamide and other similar mono and diamino silanes. In addition to the amine silane coupling agent, there may be present a lubricant modified amino silane coupling agent. Both of these silane coupling agents, when they are monoamino silane coupling agents, would have amino functionality which can be designated by the general formula:

$$NH_2R-Si-(OR^1)_3$$

wherein R is an alkylene radical having from 2 to 8 carbon atoms and $R^1$ is a lower alkyl radical or hydrogen; the lower alkyl radical having 1 to 5 carbon atoms, preferably having 1 or 2 carbon atoms. Additional examples of amino silanes include aminomethyltriethoxysilane, aminopropyltrimethoxysilane, diaminopropyldiethoxysilane, triaminopropylethoxysilane, and the like.

In addition to the amino silane, there may be present an epoxy containing silane coupling agent having a formula such as

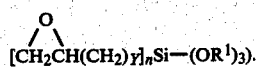

Where $R^1$ is as described above and Y is an integer from 1 to 6. Representative examples of the epoxy silane include beta-hydroxyethyltriethoxysilane, gamma-hydroxypropyltrichlorosilane, bi-s-(delta-hydroxybutyl)dimethoxysilane, delta-hydroxybutyltrimethoxysilane, 2,3-epoxypropyltrimethoxysilane, 3,4-epoxybutyltriethoxysilane and bis-(2,3-epoxypropyl)dimethoxysilane, glycidoxypropyltrimethoxysilane, 3,4-epoxycyclohexyltriethoxysilane.

A number of other silanes containing at least one organic group substituted by one or more of an amino group or epoxy group may also be used in the practice of the present invention, and these silanes are well known to those skilled in the art. The amount of the silane coupling agent present in the aqueous sizing composition is in the range of about 0.1 to about 4 weight percent of the aqueous sizing composition. It is preferred to use a mixture of the silane coupling agents which contains the amino silane in a predominant amount of the 0.1 to 4 weight percent of the aqueous sizing composition and a minor amount of the lubricant modified amino silane coupling agent. The most preferred mixture of the silane coupling agents used in the aqueous sizing composition of the present invention utilizes the amino silane in the predominant amount, the epoxy silane in a minor amount and the lubricant modified amino silane in a smaller amount of the 0.1 to 4 weight percent of the aqueous sizing composition.

Lubricants that are useful in the aqueous sizing composition of the present invention include any lubricant that is a cationic surface-active agent such as amine-containing fatty acid or other similar lubricating material or a quaternary ammonium group-containing fatty acid or other similar lubricating material. Nonexclusive examples of lubricating materials that may be used in the aqueous sizing composition of the present invention include epoxy alkylated amines, alkyl trialkyl ammonium chloride, alkyl imidazoline derivatives, pelargonate, amides, tetraalkylene pentamine derivatives, acid-solubilized, fatty acid amides such as stearic amide, saturated and unsaturated fatty acid amides, wherein the acid group contains 4 to 24 carbon atoms; anhydrous, acid-solubilized polymers of the lower molecular weight unsaturated fatty acid amides; alkyl imidazoline derivatives such as alkyl-N-amido-alkyl imidazolines that may be formed by reacting fatty acids with polyalkylene polyamines under the conditions, which produce ring closure and the like. The amoumt of the lubricant used in the aqueous sizing composition is that amount which is conventionally used in aqueous sizing compositions, which is typically from about 0.1 to 5 weight percent of the aqueous sizing composition.

The aqueous dispersible, solubilizable or emulsifiable polyethylene polymer useful in the aqueous sizing composition of the present invention can be a low density or medium density polyethylene with a minimum degree of branching, high density polyethylene, which has comparatively straight and closely aligned molecular chains or ultra-high molecular weight polyethylene. It is believed, but the present invention is not limited by this belief, that the linearity of the polyethylene molecular chain assists in producing the slip/flow characteristic of the sized glass fiber strand of the present invention. The polyethylene polymer is preferably a polyethylene with limited branching and with a molecular weight of around 2,000 to around 250,000 or greater even up to around 1.5 million or more, where the high molecular weight is also solubilizable, dispersible of emulsifiable in aqueous solutions. By the terminology "with limited branching" it is meant that the polydispersity index ($\overline{Mw}/\overline{Mn}$) is less than 10 and preferably less than 3. The polyethylene with limited branching may also contain small amounts of methyl groups on the polymer backbone. The polyethylene with limited branching can be produced by the use of Ziegler-type catalysts and supported metal oxides. Examples of the processes for producing these polyethylene polymers include the Phillips Petroleum Company, the Ziegler-Natta Process and the Allied Corporation Process. Aqueous emulsions of the polyethylene with limited branching polymers are commercially available and these products have a milky emulsion appearance, a fairly high percentage of volatile water and are usually nonionic.

The medium density polyethylene having a specific gravity of around 0.940 to 0.955 is a blend of low density and high density polyethylene. The low density polyethylene generally has highly branched and highly spaced chains, whereas the high density polyethylene and ultra-high molecular weight polyethylene are substantially linear and have closely aligned chains. The branched chain, low density type polyethylene has a specific gravity of around 0.915, crystallinity of 50-60% and it is derived from ethylene which is polymerized in a free radical-initiated liquid phase reaction at elevated pressure and temperature with the use of catalysts. The high density polyethylene has a specific gravity of around 0.95, crystallinity of 90% and is polymerized from ethylene by the use of Ziegler or supported metal oxide catalysts at from one to 100 atmosphere, at from room temperature to 200° F. (93° C.).

Also, the polyethylene may be present as a copolymer where the ethylene is copolymerized with varying percentages of 1-olefins or other materials, for example, 1-pentene, 1-butene and the like and 2-butene or acrylic acid and propylene from which a crystalline product results. When the polyethylene is a copolymer of polethylene and polyethylene with a majority of the copolymer being polyethylene, the polypropylene that is employed has an average molecular weight in the range of about 5,300 to 7,300 and a ring and ball softening point of 150° to 175° C., a density of 0.85 to 1 gram per cubic centimeter and a penetration hardness (10 grams/5 seconds/72° F.) in tenths of a millimeter of 0.01 maximum.

The average molecular weight of the polyethylene is in the range of about 2,000 to greater than 1.5 million. When the higher molecular weight polyethylene cannot be suitably dispersed, emulsified or solubilized in water by standard techniques, the polyethylene can be degraded by heat and/or oxidation to reduce the molecular weight. Such standard techniques include emulsifying the polyethylene or polyethylene copolymer by melting the polyethylene or polyethylene copolymer and adding suitable emulsifying agents. This mixture is stirred and then water is added until the water-in-oil emulsion inverts to an oil-in-water emulsion. The emulsion contains about 15 to about 40% by weight of solids (non-aqueous ingredients) based upon the weight of the emulsion. Suitable emulsifying agents include Triton X100 surfactants, Igepal CO630 surfactant and Tergitol surfactants and various anionic emulsifying agents.

A polyethylene emulsion which is suitable for use in the practice of the present invention is commercially available under the trade designation "Protolube HD" from Proctor Chemical Co., Inc. This material is a nonionic polyethylene emulsion having a solids content of approximately 26%, a pH (1% solution) of approximately 8 and with approximately 75% water which has an appearance of a milky emulsion and an odor of mild wax.

When the polyethylene is degraded to reduce the molecular weight in order to obtain an aqueous dispersible, emulsifiable or solubilizable polyethylene, it is preferred that the degradation occur by a method that reduces the formation of branching and of double bonds in the degraded product. Such a method involves thermally degrading the polyethylene and then oxidatively degrading the thermally degraded polyethylene with a mixture of oxygen and ozone in the presence of low molecular weight polyethylene as shown in U.S. Pat. No. 3,692,877.

The amount of the aqueous dispersible or solubilizable or emulsifiable polyethylene polymer used in the aqueous sizing composition of the present invention ranges from about 0.1 to about 10 and about 0.1 to about 3 weight percent of the aqueous sizing composition. The amount of the polyethylene-containing polymer on a solids basis in the sizing composition is from around 1 to about 25 weight percent of the solids of the sizing composition.

In addition, the aqueous sizing composition of the present invention has an aqueous soluble, emulsifiable or dispersible wax. The wax may be any suitable wax selected from the group consisting of vegetable waxes, such as carnuaba, Japan, bayberry, candelilla, and the like; animal waxes such as beeswax, Chinese wax, hydrogenated sperm oil wax and the like; mineral waxes such as ozocerite, montan, ceresin and the like; and synthetic waxes such as polyalkylenes like polyethylenes, polyethylene glycols, polyethylene esters, chloronaphthalenes, sorbitals, polychlorotrifluoroethylenes; petroleum waxes such as paraffin, microcrystalline waxes and the like. The waxes are preferably those having a high degree of crystallinity and obtained from a paraffinic source, and most preferably are microcrystalline waxes. The microcrystalline waxes usually are branched chain paraffins having a crystal structure much smaller than that of normal wax and also a much higher viscosity, and they are obtained by dewaxing tank bottoms, refinery residues and other petroleum waste products. Of these waxes, the most preferred is that having a melting point of about 50° C. or more. The waxes are typically used in the sizing formulation of the instant invention as aqueous dispersions containing 20 to 60 percent by weight wax. In the aqueous sizing formulation of the present invention the wax component is present in an amount of about 0 to about 6 and preferably 0 to 2 weight percent of the aqueous sizing composition. On a solids basis of the sizing composition, the aqueous dispersible wax is present in an amount of about 0 to about 10 and preferably about 0.1 to about 4 weight percent. An example of a suitable wax material is that available from Boler Petroleum Co. under the trade designation "518 Emulsion". This material is a thixotropic anionic microcrystalline wax emulsion with a melting point of around 87° C. to 92° C. and a percent solids of around 30±0.5 by azotropic distillation and a viscosity at 21° C. of 5±25 centipoise measured according to LVF Brookfield, No. 2 spindle at 60 RPM for 2 minutes, and with a pH at 21° C. of 8.5. Another example is the wax dispersion designated 84630 from Michelman Chemical Co.

When the polyethylene-containing polymer that is used in the composition of the present invention has a limited amount of branching such as, polyethylene with a density greater than around 0.935, the amount of wax present in the composition can be deleted or reduced. With the use of this polyethylene polymer in a slightly greater amount that that amount used when the wax is present, the amount of wax can range from 0 to about 2 weight percent of the aqueous sizing composition or from 0 to about 4 weight percent of the solids of the aqueous sizing composition. The polyethylene with limited branching is an aqueous dispersible, emulsifiable or solubilizable medium density, high density or ultra-high molecular weight polyethylene or a degradation derivative thereof prepared by thermal and/or oxidative degradation in such a manner as to limit the formation of branching and of double bonds in the polymer chains.

When both the polyethylene and wax are present the weight ratio of the polyethylene-containing polymer to the wax in the aqueous sizing composition is in the range of about 1:25 to about 25:1. It is also noted that the combined amount of the polyethylene-containing polymer and the wax must not exceed about 15 weight percent of the aqueous sizing composition. Amounts in excess of 15 weight percent will give too great a reduction or an unacceptable reduction in the tensile strength of the sized glass fiber strand and will not give any additional benefits in slip/flow characteristics of the sized glass fiber strand. When the polyethylene with limited branching is present without the presence of wax, the amount of the polyethylene should not exceed about 10 weight percent of the aqueous sizing composition for the same reasons.

The aforementioned components of the aqueous sizing composition including the vinylacetate-organo silane copolymer and epoxy, function as the film formers in the sizing composition. The polyethylene-containing polymer and wax function as the film former modifiers in the sizing composition. The non-starch film formers function to provide compatability with the matrix resin in addition to providing film forming characteristics for the strand. In addition, the non-starch film forming polymeric materials also provide functional groups which can provide bonding, by hydrogen bonding, by Van der Wall's forces, or by chemical bonding between the thermoplastic or thermosetting matrices and the glass fiber strand or silane compounds bonded to the glass fiber strands. The polyethylene-containing polymer alone or in conjunction with the wax modify the film forming characteristic, but in addition, the polyethylene alone or in conjunction with the wax serve as gives the sized glass fiber strands a slip/flow characteristic. To obtain this characteristic the polyethylene with limited branching when present without wax must be in the range of amounts as specified above, or when both the polyethylene and wax are present the weight ratio of the polyethylene-containing polymer to the wax must be in the range of about 25:1 to about 1:25 and preferably about 1:1 to about 10:1. Ratios of amounts outside this range of 25:1 to 1:25 do not provide any additional benefits for the increased cost of the increased addition of one or the other material. A slightly lesser degree of slip flow characteristic can be provided by just the presence of a polyethylene polymer with limited branching. The slip/flow characteristic is measured by a funnel flow test. This test is conducted by placing a predetermined weight of chopped glass fiber strand in a funnel equipped for vibration. The time it takes for the predetermined weight to pass through the vibrating funnel is the funnel flow time. This time can range from several seconds for good slip/flow characteristics to several minutes for poorer slip flow characteristics.

As can be appreciated by those skilled in the art, additional ingredients can be included in the aqueous sizing composition such as additional film formers, lubricants, wetting agents and silane coupling agents, surface energy modifiers such as surfactants for facilitating sizing stability, coatability, uniformity, and wettability, and process aids to promote mechanical handling properties during the fabrication and use of the resultant sized chopped glass fiber strand product. All the additives are those used by those skilled in the art. These additional components may be added but are not necessary to achieve the sized glass fiber strands having integrity or chopping and slip/flow properties between strands and in polymeric molding compounds and the reinforced thermosetting polymeric materials with improved impact properties.

The total solids (non-aqueous) content of the sizing composition is about 1 to about 30 percent by weight of the aqueous size and preferably about 3 to about 18% by weight of the size. In all events, the amounts of the solids components of the aqueous sizing composition should not exceed that amount which will cause the viscosity of the solution to be greater than about 100 centipoise at 20° C. Solutions having a viscosity of greater than 100 centipoise at 20° C. are very difficult to apply to glass fiber strands during their formation without breaking the strand. It is preferred that the viscosity of the size be between 1 and 20 centipoise at 20° C. for best results. The pH of the aqueous sizing composition can vary from about 3 to about 11.

The aqueous sizing composition is applied to the fibers to obtain a solids application of about 0.1 to about 3% by weight based on the total weight of the fibers and the sizing composition. The aqueous sizing composition is applied to the glass fibers during the conventional forming process to produce sized continuous glass fiber strands or wet chopped glass fiber strands. In producing wet chop or continuous glass fiber strands, the sizing composition is applied to the fibers prior to the time they are gathered together to form one or more strands by means of any applicator known in the art to contact a liquid with a solid object such as a roller applicator which is partially submerged in the sizing composition contained in a reservoir such as the applicator shown in U.S. Pat. No. 2,729,972 hereby incorporated by reference, or a spray applicator. The fibers can be gathered into one or more strands by one or more gathering shoes for winding onto a forming package rotating at a sufficient speed to attenuate the fibers from the orifices in the bushing of a glass fiber batch melting furnace. Also, the fibers can be gathered into one or more strands and passed to a pair of rotating wheel pullers that attenuates the fiber from the bushing. The wheel puller either disposes of the continuous strand into a suitable collecting device, or directs the strands to a chopping device for wet chopping. Other methods of applying the sizing composition to the strands of glass fibers such as pad applicators may be employed and a strand may be formed by means other than winding on the forming tube, or by means of a pair of rotating wheel pullers.

Also, as can be appreciated by those skilled in the art, any conventional method for producing wet chopped glass fiber strands or dry chopped glass fiber strands during the forming process for producing glass fibers can utilize the aqueous sizing composition of the present invention. The glass fiber strands that are formed by a wet chop or dry chop glass fiber forming process are dried in a drier for a time and at a temperature sufficient to remove a substantial amount of moisture from the strands and to set the cure of the coating. In the wet chop process, the drying is preferably performed at a short residence time and high temperature of around 150 C. or higher. In this case, it is preferred that the aqueous sizing composition used to treat the glass fiber strands contain the mixture of an amino silane and epoxy silane coupling agents in order to achieve good impact properties for the subsequently reinforced thermoplastic or thermosetting polymers. When the glass fiber strands are processed into continuous glass fiber strands, they are dried preferably in conventional drying ovens at temperatures of at least around 115° C. for around 11 hours or any other temperature/time condition relationship that will give equivalent drying. After this drying step, the continuous glass fiber strands can be chopped or processed into roving for reinforcement of thermoplastic or thermosetting polymers. The size glass fiber strands in any form are now suitable for use in methods known to those skilled in the art for producing glass fiber reinforced thermoplastic and thermosetting polymers.

PREFERRED EMBODIMENT

In the preferred embodiment of the present invention, the aqueous sizing composition has more than one film former, at least an amino-organo silane coupling agent and a textile lubricant or a lubricant modified aminosilane coupling agent, along with the polyethylene-containing polymer and wax. In the preferred embodiment, the polyethylene-containing polymer is preferably a high density polyethylene in an aqueous emulsion and the wax is preferably a microcrystalline paraffinic wax with a melting point above 70° C. The total amount of film forming polymer in the aqueous sizing composition is in the range of about 2 to about 10 weight percent of the aqueous sizing composition and about 10 to about 95 weight percent of the solids of the sizing composition. The total amount of the silane coupling agent present in the aqueous sizing composition is from about 0.05 to about 2 weight percent of the aqueous sizing composition and about 0.5 to about 10 weight percent solids of the aqueous sizing composition. The lubricant is present in an amount of about 0.1 to about 3 weight percent of the aqueous sizing composition or about 1 to 3 weight percent solids of the aqueous sizing composition. When the lubricant is present as a lubricant modified aminoorgano silane coupling agent, it is present in an amount in the range of about 0.005 to about 0.1 weight percent of the aqueous sizing composition or about 0.05 to 1 weight percent of the solids of the aqueous sizing composition. The high density polyethylene polymer is present in an amount of about 0.1 to about 3 weight percent of the aqueous sizing composition or about 5 to about 20 weight percent solids of the aqueous sizing composition. The microcrystalline wax with a melting point greater than about 70° C. is present in the aqueous sizing composition in an amount in the range of about 0.01 to 1 weight percent of the aqueous sizing composition or about 0.5 to 3 weight percent of the solids of the aqueous sizing composition.

Particular details of the preferred embodiment depend upon whether or not the sized glass fiber strands to be produced with the aqueous sizing composition is to be used to reinforce thermoplastic polymers or thermosetting polymers. If the sized glass fiber strand is to be used in reinforcing thermoplastic polymers, it is preferred that the aqueous sizing composition have the following formulation.

| Component | Amount in Solid Weight % | Amount in Aqueous Weight % |
|---|---|---|
| H₂O for 2 & 3 | 30–50 percent of total volume | |
| Gamma-aminopropyltriethoxysilane (A-1100) | 2 to 7 | .05 to 1 |
| Lubricant modified gamma-aminopropyltriethoxy silane (A-1108) | .05 to 1 | .005 to .1 |
| Acetic acid to adjust pH to 7.5 ± 1.0 | | |
| Gamma-glycidoxypropyltrimethoxy silane (A-187) | 0.5 to 3 | .01–1 |
| Cold water for the gamma-glycidoxypropyltrimethoxy silane | 1 to 30 10 to 60 liters | |
| Substantially aliphatic polyurethane polymer with a small amount of carboxylation (Rucothane 2010L) | 5 to 60 | 1 to 5 |
| Polyethylene containing polymer (aqueous emulsion available as Protolube HD) | 5 to 20 | 0.1 to 3 |
| Epoxy polymer (aqueous dispersion available as CMD 35201) | 5 to 60 | 1 to 5 |
| Microcrystalline wax with a melting point greater than 70° C. available as Boler 518 Wax Emulsion | .5 to 3 | 0.01 to 1 |

This formulation was prepared into a sizing composition by first adding deionized water to a mix tank having stirring capabilities. The amount of water added to the mix tank is around 30 to 50 percent of the total volume of the sizing composition. The gamma-aminopropyltriethoxysilane available as A1100 from Union Carbide Corporation was added to the mix tank with agitation for several minutes. The lubricant modified gamma-aminopropyltriethoxysilane available from Union Carbide under the trade designation A-1108 was added to the mix tank and agitated for several minutes. The pH was then adjusted to 6.5–8.5 with dilute (50/50) acetic acid. A small amount of water was added to a premix tank and the gamma-glycidoxypropyltrimethoxysilane available from Union Carbide Corporation under the trade designation A187 was added to the premix tank and the mixture was then added to the main mix tank. The main mix tank at this point contained a mixture of the silane coupling agents to be used in the aqueous sizing composition.

One nonstarch film forming polymer to be used is the polyurethane polymer which is substantially aliphatic and available as an aqueous emulsion from Hooker Chemical Company under the trade designation Rucothane dispersion. This material is added to the main mix tank. The polyethylene-containing polymer which is a high density polyethylene in an aqueous emulsion available from Proctor Chemical Company under the trade designation Protolube HD is added to the main mix tank. The other non-starch film forming polymer is the polyepoxide polymer which is added to the main mix tank, an aqueous emulsion or suspension available from Celanese Specialties Chemical Company under the trade designation CMD35201 having a weight per epoxide of around 530. The microcrystalline was emulsion with a melting point in the range of about 85° C. to about 95° C. was added to the main mix tank. The mixture in the main mix tank was then diluted to the final desired volume and allowed to agitate for several minutes.

The aqueous sizing composition was used to treat glass fibers having a filament diameter of 13.34±0.63 microns gathered into strand having 500 to 1000 filaments per strand and chopped during formation into chopped glass fiber stand ranging from ⅛" to ¼" in length. The LOI (Loss On Ignition) of the chopped strand ranged from 0.6 to 1.25%.

The chopped glass fiber strand was used in injection molding to reinforce polycarbonate resin.

If the aqueous sizing composition of the present invention is to be used in reinforcing thermosetting polymers, it is preferred that the aqueous sizing composition have on a solids basis the following formulation.

| | |
|---|---|
| Gamma-glycidoxypropyltrimethoxysilane (A-187) | About 1 to 6 weight percent |
| Acetic acid | About .05 to 0.5 weight percent |
| Polyepoxide polymers with a molecular weight between 300 and 600, most preferably with a weight per epoxide of around 530 and a particle size between 1 and 4 microns (CMD 35201) | Between 8 to 35 weight percent |
| Poly(vinylacetate) silane copolymer (NS-1037) | Between 45 to 75 weight percent |
| Anhydrous acid solubilizable fatty acid amide lubricant dispersible or solubilizable in water (Cirrasol 185A) | 2 to 3 weight percent |
| Alkyl aryl polyether nonionic surfactant with an HLB of around 14 (Triton CF10) | 1 to 2 weight percent |
| Lubricant modified gamma-aminopropyltriethoxy silane (A-1108) | 0.1 to 0.2 weight percent |
| High density polyethylene polymer dispersible solubilizable or emulsifiable in water (Protolube HD) | 5 to 11 weight percent |
| Microcrystalline wax with a melting point greater than 70° C. (518 Emulsion) | 2.5 to 4.0 weight percent |

Although the aqueous sizing composition can be prepared by any conventional method, it is preferred to prepare the aqueous sizing composition in the following manner. In the preparation, the water is preferably deionized water and all stirring is preferably at a moderate speed with low foaming. Water at a temperature of around 55° F. to 85° F. (12°-30° C.) in an amount of around 20 to 40 percent of the final volume of the aqueous sizing composition is added to a main mix tank. The acetic acid is added to the water at a slow rate and the gamma-glycidoxypropyltrimethoxysilane is added to this mixture at a somewhat faster rate than the addition of the acetic acid. The silane is hydrolyzed for about 15 to 45 minutes.

In one premix tank, water at a temperature of 140° F. to 160° F. (60° C.-71° C.) in an amount of about 1 to about 10 percent of the final volume of the aqueous sizing composition is added. The amount of the anhydrous acid solubilizable fatty acid amide lubricant is added at a moderate rate and dissolved. When dissolved, the mixture in the premix tank is acidified with acetic acid and cooled to 100° F. (38° C.) or lower by adding about 1 to about 5 percent of the final volume of the aqueous sizing composition of water (55°-85° F. (20°-30° C.)) at a slow rate. The mixture from this premix tank is added to the main mix tank at a moderate rate.

In a premix tank, water 20°-30° C. in the amount of around 10 percent of the final volume of the aqueous sizing composition is added. The poly(vinylacetate) silane copolymer is added with the temperature in the range of around 60°-100° F. (15°-38° C.) at a fast rate with stirring. This mixture is then added to the main mix tank.

In a premix tank, water 55°-85° F. (12° C.-30° C. in an amount of around 5 to 10 percent of the final volume of the aqueous sizing composition is added and the polyepoxide polymer is added at a temperature of around 60° to 100° F. (15°-38° C.) at a fast rate. The mixture is stirred for 2 minutes and added to the main mix tank.

In a premix tank, hot water is added at a temperature of about 140° F. to 160° F. (60° C.-71° C.) in an amount of around 1 to 3 percent of the final volume of the aqueous sizing composition. The alkyl aryl polyether nonionic surfactant is added at a moderate rate, stirred for 1 to several minutes and cooled to around 100° F. (38° C.) or lower with 55°-85° F. water and added to the main mix tank.

In a premix tank, 55°-85° F. water is added in an amount of around 1 to 3 percent of the final volume of the aqueous sizing composition. Added to this water is the microcrystalline wax at a temperature of around 60° to 100° F. (15°-38° C.) at a fast rate. The mixture is stirred for 1 to several minutes and added to the main mix tank.

In a premix tank, there is added 55° F.-85° F. water in an amount of around 0.1 to 1 percent of the final volume of the aqueous sizing composition and lubricant modified gamma-aminopropyltriethoxysilane is added at a moderate rate. The silane is hydrolyzed for several minutes and added to the main mix tank at a moderate rate.

In a premix tank, 55° F.-85° F. water is added, where the water is in an amount of around 1 to 5 percent of the final volume of the aqueous sizing composition. To this water there is added at a fast rate the high density polyethylene aqueous emulsion available as Protolube HD, at a temperature of around 55° F. to around 85° F. This mixture is stirred for several minutes and added to the main mix tank.

The remaining water is added at a temperature of around 55° F. to around 85° F. and at a fast rate to make up the desired volume. The final temperature of the aqueous sizing composition is around 60° F. to 80° F. (15° C.–27° C.) and the pH is around 5 to 5.5 and the solids is around 11 to 12 weight percent, while the specific gravity is around 1.014 to about 1.018, and the viscosity in centipoise measured by UL adapter is around 1.90 to about 2.20.

This aqueous sizing composition is preferably used to treat glass fibers having a fiber diameter ranging from around 5 to around 16 microns and preferably around 8 to 15 microns. The glass fibers can be combined in any number to form strands and the strands can be chopped during the forming process known as the wet chop process, but preferably are wound into a continuous package known as a forming package. The forming packages are then dried preferably at a temperature of at least 240° F. (115° C.) for around 11 hours, although any equivalent heating accomplished by different temperatures and time can also be used. The dried glass fiber strands can be chopped or combined into a roving for chopping, where the chopping process is conducted by any conventional chopping method. Such a conventional chopping method would utilize conventional commercial choppers for dry chopped glass fiber strands. The dry chopped glass fiber strands are preferably chopped into lengths of ⅛ to ½ inch, although longer lengths and possibly somewhat shorter lengths can also be obtained. The dried chopped glass fiber strand having an average length of ⅛ to ½ inch is used preferably with bulk molding compound.

The following examples are illustrative of several formulations of the aqueous sizing composition of the present invention.

TABLE I

|  | Example 1 | Example 2 | Example 3 | Example 4 | Example 5 |
|---|---|---|---|---|---|
| Total Volume | 189.25 liters | 189.25 liters | 189.25 liters | 378.5 liters | 189.25 liters |
| Components - kilograms | | | | | |
| Gamma-glycidoxy-propyl-trimethoxy-silane A-187 | — | 0.5 | — | 1.0 | — |
| Water | — | — | — | 45.4 liters | — |
| Gamma-aminopropyl-triethoxy silane A-1100 | 1.0 | 0.5 | 1.0 | 3.3 | 0.2 |
| Lubricant modified gamma-aminopropyl-triethoxy silane (A-1108) | .04 | 0.4 | 0.4 | 0.18 | 0.008 |
| Acetic Acid, pH adjustment | 0.29 | 0.29 | 0.29 | 1.01 | 0.04 |
| Polyurethane emulsion (2010L) | 10.0 | 10 | 10 | 26.6 | 2.0 |
| Polyethylene emulsion (Protolube HD) | 5 | 10 | 10 | 13.3 | 2.0 |
| Microcrystalline Wax m.p. 87–92° C. (Boler 518) | 0.6 | 0.6 | 0.6 | 1.6 | 0.12 |
| Epoxy polymer emulsion A (CMD 35201) | 10.0 | 10.0 | 10 | 26.6 | 2.0 |
| Percent Solids | 7.25 | 8.03 | 7.9 | 10.4 ± 0.6 | 9.8 |

Table I presents five examples of aqueous sizing compositions for use with sized glass fibers for reinforcing thermoplastic polymers. All the aqueous sizing compositions were formulated as taught in the preferred embodiment.

Examples 1 and 2 were used to prepare continuous sized glass fiber strand which were subsequently chopped for reinforcing polycarbonate. Examples 3, 4, and 5 were applied to glass fibers produced into wet chopped glass fiber strand subsequently used to reinforce polycarbonate.

TABLE II

| AQUEOUS SIZING COMPOSITIONS IN WEIGHT PERCENT SOLIDS AND WEIGHT PERCENT OF AQUEOUS COMPOSITION | | | | | |
|---|---|---|---|---|---|
|  | Example 6 | Example 7 | Example 8 | Example 9 | Example 10 |
| Gamma-glycidoxypropyl-trimethoxysilane Solids 80.9 Weight Percent | 3.4/0.4 | 4.4/0.5 | 4.2/0.5 | 4.5/0.5 | 2.1/0.25 |
| Acetic Acid | 0.8 grams | .18/0.02 | 8 grams | 8 grams | 8 grams |
| Pelargonic Acid Amide of tetraethylene pentamine (Cirrosol C-185A) Solids 100 Weight Percent | 2.8/0.32 | 2.57/0.35 | 2.4/0.3 | 2.58/0.3 | 2.4/0.3 |
| Acetic Acid | 3.0 grams | 30 grams | 30 grams | 30 grams | 30 grams |
| Poly(vinylacetate)silane copolymer emulsion (NS-25-1037) 55 Weight Percent Solids | 45.9/5.4 | 73.4/8.8 | 69.5/8.32 | 48.7/5.8 | 45.9/5.5 |
| Epoxy polymer emulsion 59 Weight Percent Solids | 32.8/3.9 | 8.4/1.0 | 8.0/0.95 | 33.7/4.0 | 31.8/3.8 |
| Alkylarylpolyether Nonionic Surfactant HLB-14 (Triton CF-10) | 1.4/0.16 | 1.5/0.17 | 1.4/0.17 | 1.5/0.17 | 1.4/0.17 |
| Lubricant modified gamma-aminopropyltriethoxysilane (A-1108) 90 Weight Percent Solids | 0.1/0.01 | 0.11/0.01 | 0.02/0.01 | 0.11/0.01 | 0.1/0.01 |
| Gamma-methacryloxypropyl-trimethoxysilane (A-174) | — | — | — | — | 2.1/0.25 |

TABLE II-continued
AQUEOUS SIZING COMPOSITIONS IN WEIGHT PERCENT SOLIDS AND WEIGHT PERCENT OF AQUEOUS COMPOSITION

|  | Example 6 | Example 7 | Example 8 | Example 9 | Example 10 |
|---|---|---|---|---|---|
| Polyethylene polymeric emulsion (Protolube HD)(26.5 wt. % solids) | 10.4/1.2 | 5.4/0.65 | 10.3/1.2 | 5.4/0.64 | 10.2/1.2 |
| Microcrystalline wax (518 Emulsion) | 3.13/0.36 | 3.3/0.4 | 3.2/0.38 | 3.3/0.4 | 3.1/0.37 |

Table II presents five examples of aqueous sizing compositions for use with sized glass fibers for reinforcing thermosetting polymers. These sizing compositions were formulated in accordance with the method discussed in the preferred embodiment.

The aqueous sizing compositions of Tables I and II were used to treat glass fibers produced into sized glass fiber strands in accordance with the method of the preferred embodiment by either the wet chop or dry chop forming process. The chopped sized glass fiber strands were tested by the funnel flow and bulk density tests. The results of these tests detailing the slip/flow characteristics of the strands are presented in the data of Table III.

TABLE III
PHYSICAL PROPERTIES OF AQUEOUS SIZE AND SIZED GLASS FIBER STRANDS

| | Aqueous Size Properties | | | Strand Properties | | |
|---|---|---|---|---|---|---|
| Examples | Percent Solids | Chopped length/ Strand/Type | % LOI | Choppability Fly/Fuzz | Funnel Flow sec/kg | Bulk Density lb/ft³ |
| Example 1 | 7.25 | ¼"/K-37 | 1.13 | M/L | 5 | 34 |
| Example 2 | 8.03 | ¼"/K-37 | 1.29 | M/L | 5.5 | 34 |
| Example 3 | 7.9 | ¼"/K-6.75 | 1.70 | L/L | 4 | 38.3 |
| Example 4 | 10.4 | ¼"/K-6.75 | 0.75 | L/L | 4.5 | 38 |
| Example 5 | 9.8 | ¼"/K-6.75 | 0.75 | M/L | 5 | 37.3 |
| Example 6 | 11.5–11.9 | ¼"/K-37 | 1.9–2.3 | L/L | 9 | 36 |
| Example 7 | 12.1 | ¼"/K-37 | 1.9–2.3 | M/M | 10 | 33 |
| Example 8 | 12.1 | ¼"/K-37 | 1.9–2.3 | M/M | 7 | 33.5 |
| Example 9 | 12.1 | ¼"/K-37 | 1.9–2.3 | M/L | 7 | 32.2 |
| Example 10 | 11.6–11.9 | ¼"/K-37 | 1.9–2.3 | L/L | 12 | 35.9 |

From Table III it is shown that glass fiber strands sized with the aqueous sizing composition of the present invention and chopped have good slip/flow characteristic as indicated by the data for funnel flow and bulk density. The values for other types of chopped strand for funnel flow average around 1 minute or greater, whereas the chopped glass strand product of the present invention has funnel flow values of less than 15 seconds. Bulk density values for other chopped strands are around 28–32 and anything above is a good value, and any value above 35 is excellent. From Table III it is shown that the bulk density values for the chopped strands of the present invention range from good to excellent. The choppability of the sized glass fiber strands of the present invention were also very good as determined by visual observation of any build up of material on machinery contact points. The funnel flow and bulk density tests were conducted as described in an earlier section of this application.

The foregoing has shown an aqueous sizing composition and sized glass fiber strands that have improved slip/flow characteristic. This characteristic aids in the processing of glass fiber strands in chopped form and in other forms by allowing the strands to easily flow past one another. This improved characteristic is achieved by having an aqueous sizing composition, which has at least a film former, a coupling agent and a lubricant or a mixture of these along with a polyethylene-containing polymer alone or in addition with a wax where the combined amount of polyethylene-containing polymer and wax is not greater than 15 weight percent of the aqueous sizing composition. The polyethylene-containing polymer and wax should be present in the aqueous sizing composition in a weight ratio of about 25:1 to 1:25.

We claim:

1. In an aqueous sizing composition for treating glass fibers, having one or more film forming polymers, one or more coupling agents and one or more lubricants or any mixture thereof, and water the improvement comprising:
   (a) the one or more film forming polymers are non-starch film forming polymers that provide integrity to the glass fibers, and the aqueous composition also has:
   (b) a polyethylene-containing polymer where the polyethylene has limited branching with a polydispersity index of less than 10 which is present in an amount of about 0.1 to about 10 weight percent of the aqueous sizing composition, and
   (c) a wax having a melting point greater than 50° C. present in the aqueous sizing composition in an amount of about 0.1 to about 6 weight percent of the aqueous sizing composition, where the weight ratio of polyethylene-containing polymer to wax is about 25:1 to about 1:25 and the amount of the polyethylene and wax in an aqueous sizing composition does not exceed about 15 weight percent of the aqueous sizing composition.

2. Aqueous sizing composition of claim 1, wherein the weight ratio of the polyethylene polymer to the wax in the range of about 10:1 to about 1:10.

3. Aqueous sizing composition of claim 1, wherein the weight ratio of polyethylene to wax is about 5:1 to about 1:5.

4. Aqueous sizing composition of claim 1, wherein the polyethylene polymer is a high density polyethylene polymer.

5. Aqueous sizing composition of claim 4, wherein the high density polyethylene polymer is present as an aqueous suspension.

6. Aqueous sizing composition of claim 1, wherein the wax is a microcrystalline wax having a melting point greater than 70° C.

7. Aqueous sizing composition of claim 1, wherein the wax is present as a thixotropic anionic emulsion.

8. Sized glass fibers coated with the sizing composition of claim 1.

9. Chopped dried glass fiber strands wherein the glass fibers have the dried residue of the aqueous sizing composition of claim 1.

10. Aqueous sizing composition for treating glass fibers to yield sized glass fibers that are gathered into strands that have improved slip flow properties, comprising:
 (a) one or more non-starch film forming polymers that provide integrity to the glass fibers in an amount in the range of about 1 to about 20 weight percent of the aqueous sizing composition,
 (b) one or more coupling agents in an amount in the range of about 0.1 to about 4 weight percent of the aqueous sizing composition,
 (c) one or more nonionic lubricants in an amount in the range of about 0.5 to about 5 weight percent of the aqueous sizing composition,
 (d) a mixture of a substantially linear polyethylene-containing polymer with limited branching having a polydispersity index of less than 10 and a wax having a melting point greater than 50° C. present in the aqueous sizing composition to give a weight ratio of polyethylene polymer to wax of about 10:1 to 1:10, where the amount of the mixture in the aqueous sizing composition is not greater than about 15 weight percent of the aqueous size, and
 (e) water in an amount to give a total solids for the aqueous sizing composition in the range of about 1 to about 30 weight percent.

11. Aqueous sizing composition of claim 1 or 10, wherein the amount of the substantially linear polyethylene polymer present is in the range of about 1 to 5 weight percent of the aqueous sizing composition.

12. Aqueous sizing composition of claim 1 or 10, wherein the amount of the wax present in the aqueous sizing composition is in the range of about 1 to 5.

13. Aqueous sizing composition of claims 1 or 10, wherein the coupling agent and lubricant are present as a blend of a lubricant modified gamma-aminopropyl-triethoxysilane.

14. Aqueous sizing composition for treating glass fibers that are gathered into strands that have improved slip flow properties, comprising:
 (a) one or more non-starch film forming polymers that provide integrity to the glass fibers in an amount in the range of about 1 to about 20 weight percent of the aqueous sizing composition,
 (b) one or more coupling agents in an amount in the range of about 0.1 to about 4 weight percent of the aqueous sizing composition,
 (c) a polyethylene polymer with limited branching having a polydispersity index of less than 10 and having a density greater than around 0.935 present in an amount of less than about 10 weight percent of the aqueous sizing composition,
 (d) one or more nonionic lubricants,
 (e) a wax having a melting point greater than 50° C. present in the aqueous sizing composition in an amount ranging from 0 to about 2 weight percent of the aqueous sizing composition,
 (f) water in an amount to give a total solids for the aqueous sizing composition in the range of about 1 to about 30 weight percent.

15. Sized glass fibers coated with the sizing composition of claim 14.

* * * * *